United States Patent [19]
Stewart

[11] 3,799,349
[45] Mar. 26, 1974

[54] APPARATUS FOR CLEANING MUDDY WATER

[76] Inventor: Felix I. Stewart, 1309 O'Shaughnessey Ave., Huntsville, Ala. 35801

[22] Filed: July 3, 1972

[21] Appl. No.: 268,872

[52] U.S. Cl............... 210/154, 61/2, 210/170, 210/519, 210/532
[51] Int. Cl............................................. B01d 35/28
[58] Field of Search............. 37/57, 58, 118 R, 124, 37/126 R; 61/2, 3; 210/83, 154, 170, 519, 532

[56] References Cited
UNITED STATES PATENTS
| | | | |
|---|---|---|---|
| 3,013,395 | 12/1961 | Gaylord | 61/2 |
| 1,351,979 | 9/1920 | Valentin | 61/2 |
| 3,482,339 | 12/1969 | Buchli | 37/118 R |

FOREIGN PATENTS OR APPLICATIONS
| | | | |
|---|---|---|---|
| 315,299 | 10/1919 | Germany | 61/2 |

Primary Examiner—John Adee
Assistant Examiner—Robert H. Spitzer
Attorney, Agent, or Firm—Clarence A. O'Brien; Harvey B. Jacobson

[57] ABSTRACT

A conduit, channel or other passageway forming means is disposed in the bottom of a body of water with perforations in at least a portion of the passageway forming means to enable mud, sediment, silt and the like to collect in the conduit, channel or passageway forming means together with a structure moving through the conduit, channel or passageway forming means to remove the collected mud, sediment, silt and the like for depositing it on the bank of the body of water or in any other desired location thereby enabling continuous removal of mud, sedimentation, silt and the like from the body of water. The apparatus and the technique associated therewith may be employed in a stream, river, lake, pond or any body of water whether the water be moving or substantially still.

8 Claims, 4 Drawing Figures

PATENTED MAR 26 1974 3,799,349
Fig. 1
Fig. 2
Fig. 4
Fig. 3
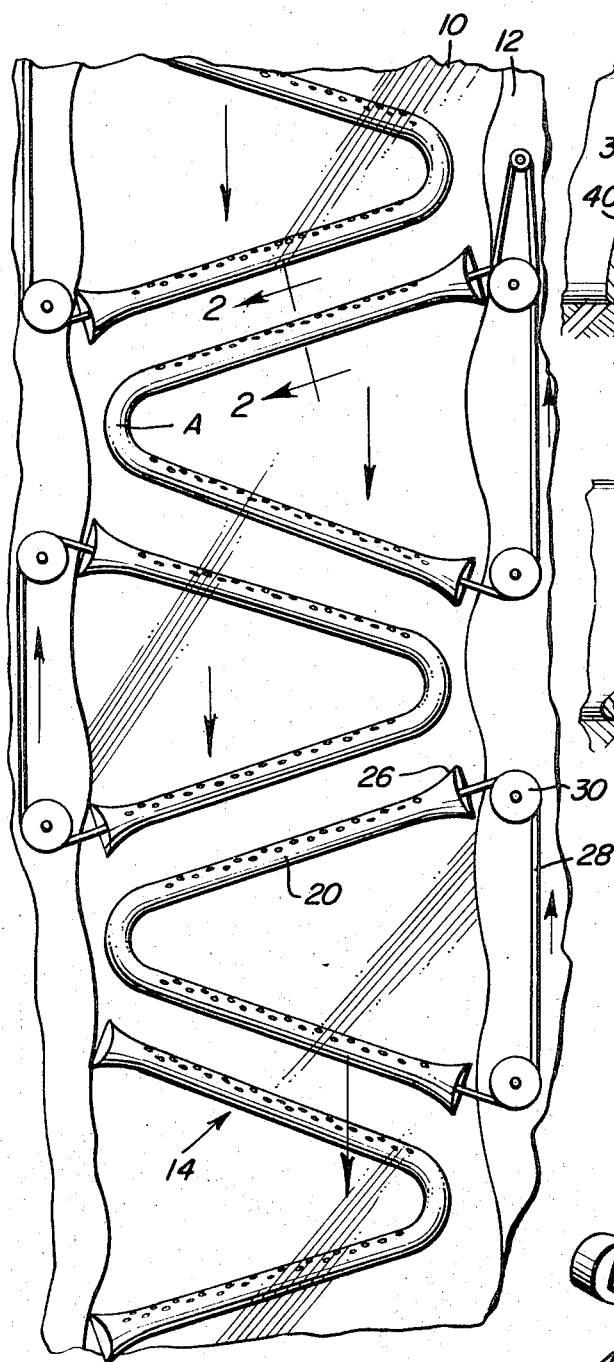
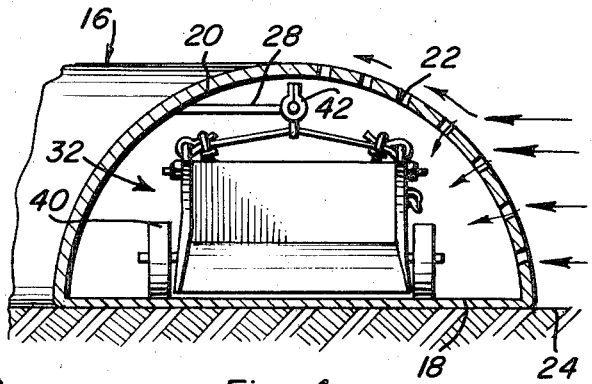
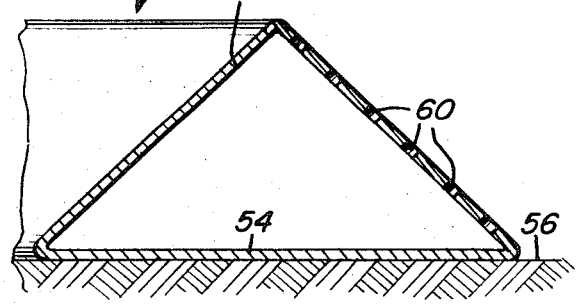
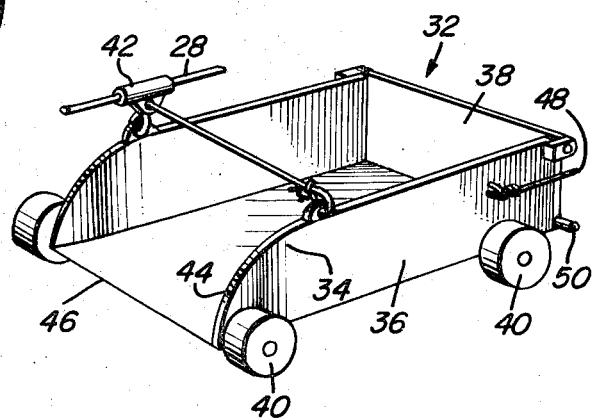

APPARATUS FOR CLEANING MUDDY WATER

BACKGROUND OF THE INVENTION

1. Field of the Invention

The present invention generally relates to an apparatus for removing mud, sediment, slit and the like from bodies of water such as streams, rivers, lakes, ponds and the like and more particularly includes a conduit disposed in or along the bottom of the body of water that has the surface thereof exposed to the water provided with perforations to enable entry of mud, sediment, silt and the like into the conduit together with a conveying apparatus moving through the conduit for moving the collected material from the conduit onto the bank of the body of water or to any desired location.

2. Description of the Prior Art

Sediment traps for streams are known in the prior art. For example, U. S. Pat. No. 2,436,630 discloses a sediment trap in the form of a conduit having a vertically disposed collecting chamber at one end and a water inlet at the other end which can flush the sediment from the conduit into the chamber. Other U. S. patents such as U.S. Pat. Nos. 1,351,979; 1,042,792; 719,240 and 782,965 disclose similar type devices in which gravity flow of water is used to flush out the sediment collected in the sediment trap.

When using such devices, the action of the water when it is used to flush out the collected sediment will agitate or stir the mud or sediment thus remixing the water and mud and causing some of the mud to flow out of the sediment trap. In addition, the water flushing of the sediment frequently leaves a layer of sediment on the bottom of the sediment trap which tends to build up and fill the sediment trap so that it becomes inoperative or ineffective for removing sediment.

SUMMARY OF THE INVENTION

An object of the present invention is to provide an apparatus for removing mud, sediment, silt and the like from a body of water which includes a conduit on the bottom of the body of water with the conduit having perforations on the upper surface thereof for permitting entry of sediment, mud, silt and the like together with a mechanical conveying device disposed in the conduit for conveying the material collected in the conduit along the length of the conduit for discharge onto the bank of the water or at a desired location.

A further object of the invention is to provide a device for removing mud, sediment, silt and the like from a body of water in accordance with the preceding object in which the conveying means is in the form of a cable or other flexible member movable through the conduit with the cable having a plurality of spaced buckets, scoops or the like attached thereto for removing the collected material from the conduit onto the bank or other suitable location.

Still another object of the invention is to provide an apparatus in accordance with the preceding objects in which the conduit is of generally U-shaped configuration with the two ends thereof communicating with or associated with the same bank of the body of water so that the conveying means may be in the form of an endless conveying means having all drive components thereof associated with a single bank of the body of water.

Yet another important feature of the present invention is to provide an apparatus for removing mud, sedimentation, silt and the like from a body of water in accordance with the preceding object in which the generally U-shaped conduits are oriented in overlapping relation in regard to the flow of a stream or the like in order to effectively remove mud and the like over a relatively long effective length of the stream, river or the like.

A further object of this invention is to provide an apparatus for cleaning a body of water by removing mud, sedimentation, silt and the like therefrom which is relatively simple in construction, flexible in installation and utility, easy to install, operate and maintain and effective for cleaning various types of bodies of water.

These together with other objects and advantages which will become subsequently apparent reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

FIG. 1 is a plan schematic view of the apparatus for cleaning a body of water illustrating schematically a typical installation.

FIG. 2 is a transverse, sectional view taken substantially upon a plane passing along section line 2—2 of FIG. 1 on an enlarged scale, illustrating the perforations on the upsteam side of the conduit and the association of the buckets or scoops therewith.

FIG. 3 is a perspective view of one of the buckets or scoops movable in the conduit.

FIG. 4 is a transverse sectional view of another form of conduit illustrating the possible variations in shape thereof.

DESCRIPTION OF THE PREFERRED EMBODIMENTS

Referring now specifically to the drawings, a river, stream or other body of water is designated by the numeral 10 and is confined by opposed banks 12 which may be in the form of river banks, stream banks, levees, dams or other retaining structures for a body of water with the arrows in FIG. 1 illustrating the direction of flow of the stream or river.

The apparatus for removing mud and the like from the water is generally designated by reference numeral 14 and includes a hollow conduit 16 which includes a substantially flat bottom 18 having an integral semi-cylindrical top portion 20 integral therewith. As illustrated in FIG. 2, the upstream side of the semi-cylindrical body 20 is provided with a plurality of perforations 22 that are distributed in any suitable pattern and serve to permit entry of water which has mud, sedimentation, silt or the like entrained therein and which will enable such material to settle onto the upper surface of the bottom member 18. While some flow of the water will flow around the semi-cylindrical body 20, a portion of the water and the material entrained therein will flow into the semi-cylindrical body 20 which forms, in effect, a trap to enable the mud, silt and the like to settle out onto the upper surface of the bottom 18 of the conduit 16. The bottom 18 of the conduit 16 may be anchored to or secured in or on the bottom surface 24 of the body of water 10 in any suitable manner. Also, as illustrated in FIG. 1, the conduit 16 is generally of U-shaped configuration with the two ends 26 thereof being disposed on or associated with the same bank 12 with the ends of the conduit being elevated so that the terminal ends thereof are disposed above water level or outwardly of the body of water. With this arrangement, a multiplicity of conduits 16 may be oriented in overlapping relation as illustrated so that a relatively long length of the stream or river 10 may be effectively cleaned by the apparatus 14 with the number of apparatuses being employed, of course, being variable.

For removing the mud from the bottom 18 of the conduit 20, an endless flexible cable 28 is disposed in the conduit 16 and is entrained over suitable pulleys 30 exteriorly of the conduit 16 and also interiorly of the conduit 16 if desired with one of the exterior pulley arrangements being driven by any suitable mechanism. The specific structure for supporting, guiding and driving the cable 28 is not illustrated since any conventional structural devices may be employed for this purpose.

Attached to the flexible cable 28 is a plurality of scoops or buckets 32 in the form of an open-ended container which includes a bottom 34, side walls 36, an openable back wall 38 for dumping, supporting wheels 40 and a cable-gripping device 42 by which the scoop is connected to the cable 28. The forward ends of the side walls 36 are outwardly flared as at 44 and the forward end of the bottom 34 is downwardly flared at 46 so that substantially the entire width of the bottom surface 18 will be engaged by the leading end or scoop end of the scoop or bucket 32 so that all of the mud, sediment, silt or the like will be collected from the upper surface of the bottom member 18 of the conduit 16. The scoops supported from the cable may be interconnected by a flexible cable or other member 48 and the rear of the scoop 38 may be pivoted upwardly by a projection 50 thereon engaging a stationary projection where the collected material is to be dumped. The specific details of the scoop, the manner of interconnecting the scoops and the manner of connecting the scoops to the cables and guiding the structure as well as driving the conveying structure incorporate conventional structural features such as structures similar to or equivalent to those shown in my prior U.S. Pat. No. 2,836,983, issued June 3, 1958 and U.S. Pat. No. 3,435,782, issued Apr. 1, 1969.

FIG. 4 illustrates a modified form of conduit generally designated by numeral 52 and which is substantially triangular in shape with a bottom member 54 resting on the bottom 56 of the body of water and provided with a pair of upwardly extending wall members 58 with at least one of the wall members 58 having perforations 60 therein. Various configurations of the conduit may be used and the size of the conduit may be varied depending upon the particular installation requirements.

The perforations in the conduits may also vary in size and arrangement but are sufficient to screen out fish and other aquatic life so that the installation of the conduit will have no adverse affect upon the fish population or marine life in the body of water. This device will effectively trap mud from the water and place it back on the bank or wherever desired. The small buckets or scoops moving in the conduit will preferably move at the speed of the current of the water so that very little agitation or remixing of the mud and water will occur. These buckets or scoops are connected in tandem and powered by the endless wire pulley and automatic cable gripper with the lip of the scoop or bucket being positioned just above the bottom of the conduit to keep it from hanging or wearing out the conduit. The conduit may be made in sections for ease of handling and the buckets or scoops may be positioned at any desired spacing along the conduit with the cable and buckets being guided by suitable pulleys oriented where necessary for support of the cable and buckets connected thereto with the ends of the conduit being preferably flared at 26 and either open to the atmosphere above water level or opening on the bank and communicated with any suitable mechanism for dumping the buckets or otherwise removing the mud therefrom. As illustrated in FIG. 3, the front edge of the wheels project in front of the bottom edge of the scoop to prevent the forward bottom edge 46 from catching or hanging on the bottom member 18 in the event the rear of the scoop swings upwardly or is raised up for any reason. Also, the tripping device to dump the bucket may include rigid rods oriented in a desired location for opening rear wall 38 or tilting the scoop for dumping. Other conventional devices may be provided for dumping the scoop at a desired location.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for removing mud, sediment, silt and the like from muddy water into a body of water comprising conduit means adapted to be supported along the bottom surface of the body of water, perforations in said conduit means enabling entry of water with mud entrained therein and trapping the mud within the conduit means, and conveyor means disposed in said conduit means for moving trapped mud, sediment, silt and the like longitudinally of the conduit means for discharge of the material at a desired location exteriorly of the body of water, said conduit means including an elongated tubular member having a substantially flat bottom adapted to rest on the bottom surface of the body of water, said perforations being in the upper portion of the tubular member and disposed toward the upstream side of a flowing stream of water, said conveyor means including a flexible member movable through the conduit means, and a plurality of buckets connected with the flexible member and movable therewith through the conduit means for collecting mud, sediment, silt and the like in the conduit means and moving it longitudinally thereof for discharge exteriorly of the body of water.

2. The structure as defined in claim 1 wherein said conduit means is disposed in a flowing stream of water, and being of substantially U-shaped configuration with the ends of the conduit means being disposed exteriorly of the stream of water with the flexible member entering one end of the conduit means and exiting from the other.

3. The structure as defined in claim 2 wherein said flexible member is in the form of a cable, said buckets being in the form of scoops opening in the direction of travel for scooping material from the interior of the conduit means and conveying it longitudinally thereof and discharging it exteriorly of the body of water.

4. The structure as defined in claim 3 wherein said buckets are connected to each other and are movable substantially at the same speed as the speed of the water current in the flowing stream.

5. The structure as defined in claim 1 wherein said conduit means is substantially semi-cylindrical in configuration.

6. The structure as defined in claim 1 wherein said conduit means is substantially triangular in configuration.

7. An apparatus for removing mud, sediment, silt and the like from muddy water in a body of water comprising conduit means adapted to be supported along the bottom surface of the body of water, perforations in said conduit means enabling entry of water with mud, sediment, silt and the like entrained therein and trapping this material within the conduit means, and conveyor means disposed in said conduit means for moving trapped mud, sediment, silt and the like longitudinally of the conduit means for discharge of the material at a desired location exteriorly of the body of water, said conduit means including an elongated tubular member having a substantially flat bottom adapted to rest on the bottom surface of the body of water, said conveyor means including a flexible member movable through the tubular member, and a plurality of buckets connected with the flexible member and movable therewith through the tubular member for collecting mud, sediment, silt and the like therein and moving it longitudinally thereof for discharge exteriorly of the body of water.

8. The structure as defined in claim 7 wherein each of said buckets are in the form of scoops opening in the direction of travel and engaged with the flat bottom surface of the tubular member.

* * * * *